Patented July 24, 1962

3,046,116

LIGHT SENSITIVE MATERIAL FOR PRINTING AND PROCESS FOR MAKING PRINTING PLATES

Maximilian Paul Schmidt, Wiesbaden-Biebrich, Germany, assignor, by mesne assignments, to Azoplate Corporation, Murray Hill, N.J.
No Drawing. Filed Feb. 14, 1958, Ser. No. 715,220
Claims priority, application Germany Mar. 24, 1951
51 Claims. (Cl. 96—33)

The present invention relates to the photomechanical production of images and printing plates. More particularly it pertains to a process of making images and especially printing plates using light-sensitive material coated with a light-sensitive layer of ortho-quinone diazides, a special group of diazo compounds.

In U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1) or 1-diazo-naphthol-(2) and have the chemical constitution of esters or amides of a sulfo-acid or a carboxylic acid of these diazo naphthols are used to produce a light-sensitive layer on a base material; this layer is then exposed to actinic light under a master pattern, and the image is developed with alkali and subsequently heated.

In the above cited patent application Serial No. 174,556 it has also been pointed out that it is possible to add resins or fatty acids to the diazo compounds or to apply such resins or fatty acids to the base material as an intermediate layer between the base and the light-sensitive layer; the heating, furthermore, can be omitted and the process may also be carried out without the use of resins or fatty acids.

The U.S. patent applications Serial No. 202,403, filed on December 22, 1950, and Serial No. 208,055, filed on January 26, 1951, both by Maximilian Paul Schmidt; Serial No. 238,369, filed on July 24, 1951, by Oskar Süs and Serial No. 268,148, filed on January 24, 1952, by Oskar Süs and Maximilian Paul Schmidt, all now abandoned, describe the use of other groups of diazo compounds that are insoluble in water and belong to the category of orthoquinone diazides.

All the inventions covered by the above-mentioned patent applications pertain to positive working processes or to the production of positives from positive master patterns or of negatives from negative master patterns.

The present invention pertains, in addition to positive working processes wherein as stated above alkali is used as developing agent, to negative working processes by means of which negative printing plates can be obtained from positive master patterns and vice-versa, positive printing plates can be obtained from negative master patterns by the use of specific water-insoluble diazo compounds of the category of ortho-quinone diazide sulfonic acid esters, if the light-sensitive material described, subsequent to the exposure of the diazo compound layer to actinic light is treated with an acid. In certain cases it may be desirable to use a mixture containing both an acid and an organic solvent. It will be understood that the light-sensitive material may be exposed to a projected light image as well as to a light image formed by contact exposure with a master pattern.

Among the ortho-quinone-diazide sulfonic acid esters mentioned above there is one group which is expressly suited for the development with acids (or acid agents) and for the manufacture of positive printing plates from negative masters. This group consists of esters of naphtho-quinone-(1,2)-diazide-sulfonic acids and hydroxy naphtho-imidazols which are substituted by alkyl in the imidazole nucleus at the nitrogen atom and possibly at the 2-carbon atom. The following formula illustrates this group:

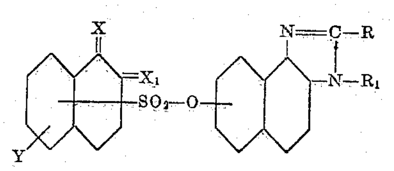

in which X and $X_1$ are $N_2$ or O and are different, Y is hydrogen or halogen, and R and $R_1$ are alkyl radicals.

The isomeric form of these compounds, in which $R_1$ is attached to the nitrogen in the 3-position rather than in the 1-position, is also included in this invention.

When proceeding in accordance with this invention, the heating operation suggested as the last step of the process described in application Serial No. 174,556 can be omitted in most cases.

This invention is based on the fact that the behaviour of the water insoluble quinone-diazides when treated with one or the other chemical treating agent is different from the behaviour of their light-transformation products in particular with respect to the adhesion to the base material, especially, if metal foils or metal sheets are used as the base support. On exposure to actinic light the quinone-diazides are believed to turn into carboxylic acids of five-membered carbocycles; thus cyclo-pentadiene-carboxylic acids are obtained from the quinone-diazides of the benzene series, and indene-carboxylic acids originate from the quinone-diazides of the naphthalene series (compare O. Süs, "Liebig's Annalen der Chemie," volume 556, page 65 (1944). In addition to these acids which constitute readily coupling azo components azo dyes can possibly form at the places affected by light due to the coupling of undecomposed quinone-diazides with the carboxylic acids resulting from the action of light.

For removing the diazo compound which remained unchanged under the dense areas of the master in the course of the exposure to light, aqueous solutions of mineral acids such as phosphoric acid, sulfuric acid, hydrochloric acid or nitric acid or of organic acids, such as formic acid, acetic acid, oxalic acid, citric acid and the like, are very well suited. Acid salts such as sodium bisulfate may also be used. The solutions of these acids may be applied to the exposed material by any suitable means, e.g. with the aid of a cotton swab or the exposed material may be bathed or immersed therein. Thickening agents, like dextrin, water-soluble cellulose ethers, gum arabic or similar substances, can be added to the acid solution and the action of the acids may be tempered by the addition of buffer salts. Frequently, the addition of salts like sodium chloride, calcium chloride, ammonia chloride or magnesium sulfate will also prove of advantage. Water-soluble organic solvents, like lower aliphatic alcohols, e.g. methanol, ethanol, propanol, ethylene-chlorohydrine, ethylene glycol, ethylene glycol-mono-alkyl ethers, diglycol or triglycol, furthermore acetone, tetrahydrofuran, dioxane and the like, can also be added to the solution with advantage. The addition of salts frequently proves of advantage also when water miscible organic solvents are used.

When developing agents made up of water and water-miscible organic solvents (which may contain salts dissolved therein) are used, also positive images from negative master patterns are obtained and vice versa. The addition of acids is not absolutely necessary, however it proves of advantage.

The development can be effected also with water-immiscible organic solvents, like benzene, xylene, etc., or with dispersions of such solvents in water that may contain acids, thickening agents or salts. Mixtures of water-immiscible solvents with water-miscible solvents can also be employed. It is possible, furthermore, to use mixtures of several water-immiscible solvents. In this case it does not necessarily prove of disadvantage, the results, on the contrary, being decidedly favorable in some instances, if solvents are added that do not readily dissolve the diazo compounds in question, as is the case with most of the low aliphatic hydro-carbons, e.g. gasoline.

The preparation of the diazo compounds to be used for the production of the light-sensitive layer in accordance with this invention which constitutionally represent esterified sulfo acids of ortho-quinone diazides and which are insoluble in water while being soluble in organic solvents, can be performed by known methods. Insofar as the methods of preparation are not already known from the literature, they have been described in detail in the following examples.

For coating the base material, it is possible to use mixtures of two or more light-sensitive ortho-quinone diazides. In some instances an improvement of the layers can be achieved in this manner. This applies, in particular, to the o-quinone diazides that have a stronger tendency to crystallize. In these instances the use of mixtures of the diazo compounds results in uniform varnish-like layers that prove strongly resistant to abrasion when applied to the base material.

Metallic bases of the kind customarily used in planographic printing, for instance, aluminum or zinc or possibly brass, and furthermore lithographic stones, are primarily suited as base materials. The surfaces of these materials may be pretreated either mechanically by brushing, sandblasting or similar means, or chemically, e.g. by phosphate bath treatment or electrochemically in known and customary manner.

For coating the base material, the diazo compounds to be used according to this invention are dissolved in an organic solvent, e.g. alcohol, dioxane, glycol ether, etc., or in a mixture of several solvents and are applied to the base by brushing, whirlcoating, spraying, immersion, roller application or any other method and are then dried.

For the purpose of facilitating the control of the exposure, dyes can be added to the sensitizing solutions which bleach out under the influence of light or compounds that get colored when exposed to light may be added, e.g. small quantities of diazo-salicylic acid which yields a red dye when exposed to light. The developed image is rendered more visible to the eye if dyes are added to the coating solutions, e.g. a small quantity of eosin (Schultz, "Farbostofftabellen," 7th edition, volume 1, page 375, No. 883). The same effect can be achieved by the use of o-quinone diazides derived from dyes, for example, o-quinone diazides which are also azo dyes; i.e. they have at least one auxochromic group in the part of the molecule connected to the sulfo acid group by esterification or amidation.

The light-sensitive layers obtained with water-insoluble o-quinone diazides in accordance with this invention can be stored for a considerable period of time in unexposed condition, and thus presensitized light-sensitive foils ready for use can be made available by the invention.

The following compounds which are referred to in the following examples represent ortho-quinone diazides which are useful according to the present invention. The parts stated in the examples are parts by weight, if not otherwise indicated.

FORMULA 1

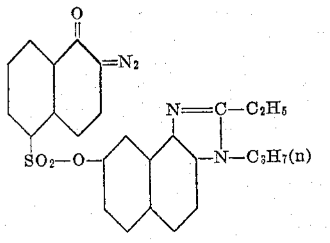

or

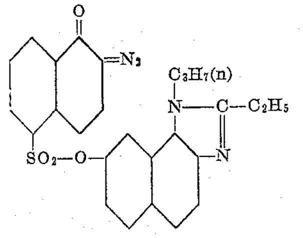

FORMULA 2

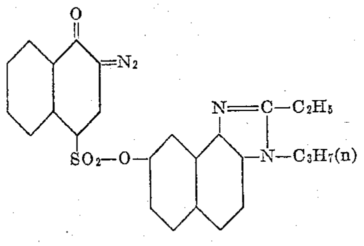

or

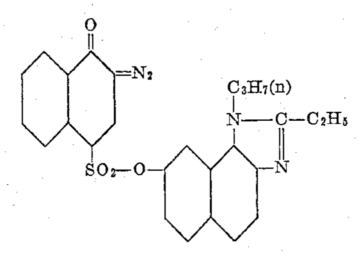

FORMULA 3

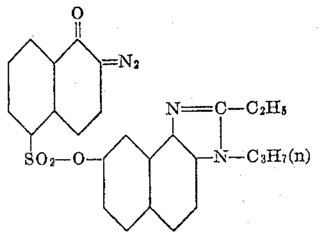

or

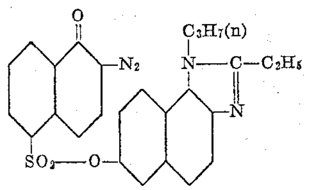

FORMULA 4

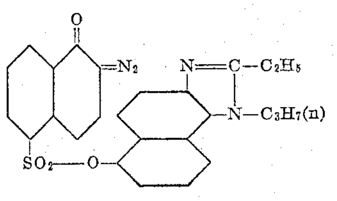

or
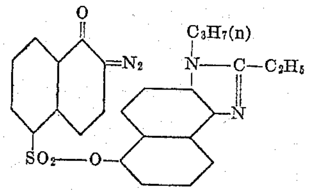
FORMULA 5
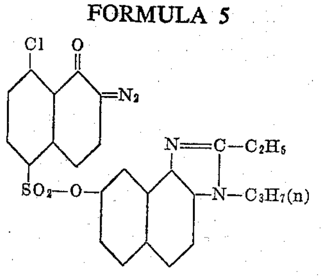
or
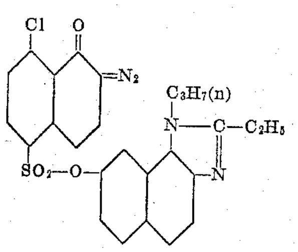
FORMULA 6
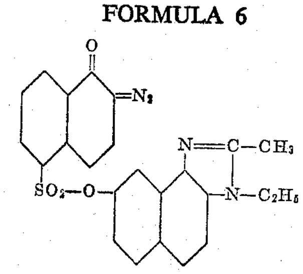
or
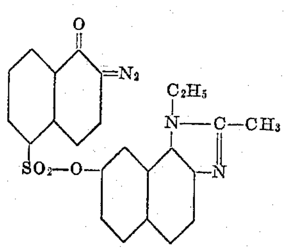
FORMULA 7
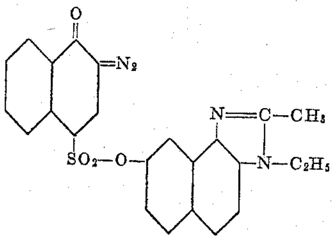
or
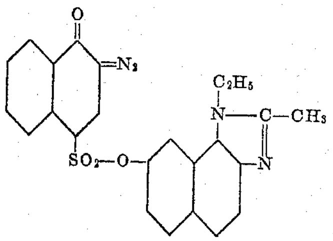
FORMULA 8
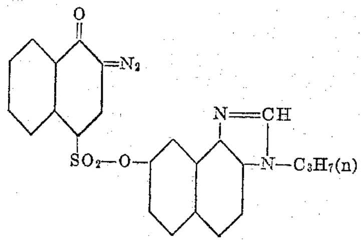
or
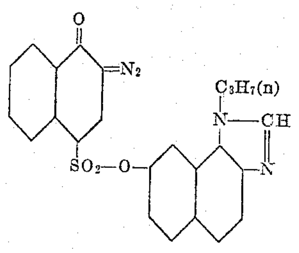
FORMULA 9
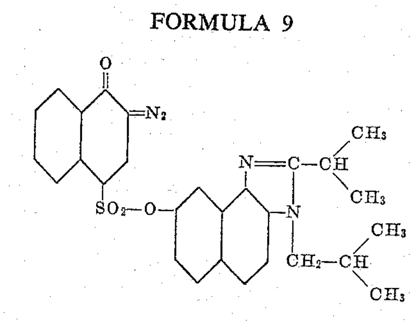
or
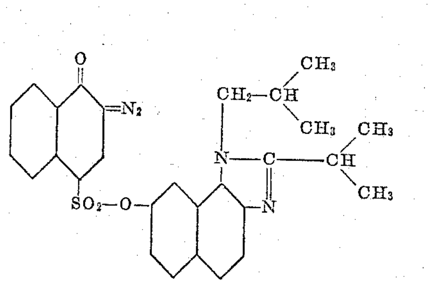
FORMULA 10
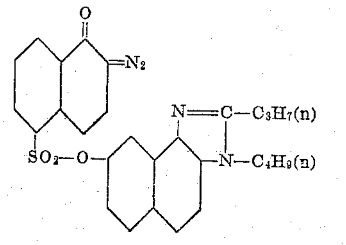
or
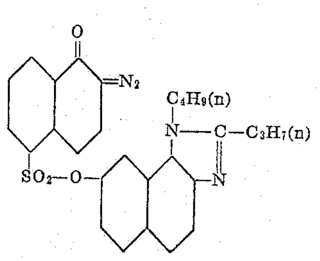

FORMULA 11

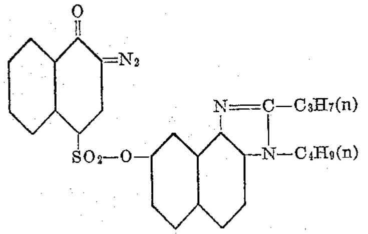

or

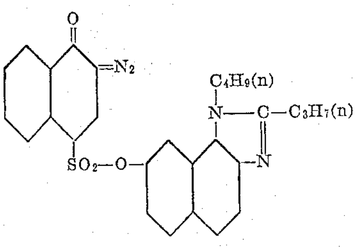

*Example 1*

A roughened aluminum foil is coated with a 1% solution of the diazo compound conforming to Formula 1 (the product of the reaction of 1 mole of naphthoquinone-(1,2)-diazide-(2)-5-sulfochloride with 1 mole of 7 hydroxy-N-(n-propyl)-C-ethyl-1,2-naphthoimidazol) in glycol-monomethyl ether. Subsequent to the exposure to light to the dried foil under a negative, the exposed foil is developed with a 3% solution of phosphoric acid by means of a cotton swab. A positive printing plate is thus obtained. The unexposed foil shows good stability. If diazo salicyclic acid is added to the sensitizing solution (approximately 10% of the quantity used of the diazo compound conforming to the Formula 1), a red image of greater visibility is obtained subsequent to the exposure.

The diazo compound conforming to the Formula 1 is obtained by the addition of a solution of 3 parts of naphthoquinone-(1,2)-diazide-(2)-5-sulfochloride in 12 parts by volume of dioxane at a temperature of 35° to 40° C. to a solution of 2.5 parts of 7′-hydroxy-2-ethyl-1(or 3)-N-(n-propyl)-naphtho-1′,2′:4,5-imidazole in a mixture consisting of 25 parts by volume of dioxane, 15 parts by volume of water, and 13 parts by volume of a 10% solution of soda. A yellow crystalline mass separates after a short time. The reaction mixture is heated for a short while to 50° C. and 100 parts by volume of water are added completely precipitating the condensation product conforming to the Formula 1. It is drawn off by suction, washed neutral with water and dried. When recrystallized from benzene and heated the diazo compound starts to discolor at a temperature of 120° C. and decomposes at 140° C.

*Example 2*

A 1% to 1.5% solution of the naphthoquinone-(1,2)-diazide-(2)-4-sulfo-acid ester of 7′-hydroxy-2-ethyl-N-(n-propyl)-naphtho-1′,2′:4,5-imidazole conforming to the Formula 2 in monomethyl-glycol-ether is applied by whirl-coating to a roughened aluminum plate and is dried thoroughly. The light-sensitive layer obtained is exposed to light under a transparent negative. Then the exposed layer is developed by being wiped over with a cotton swab soaked with a 2.5% solution of phosphoric acid, the developing solution is removed by rinsing with water and the faintly visible image is treated with the same acid solution and inked with greasy ink.

Development of the exposed layer may also be effected as follows:

(*a*) The developing agent used for soaking the cotton swab is a 10% aqueous ethylene glycol monomethyl ether containing 0.5% of phosphoric acid;

(*b*) The developing agent used for soaking the cotton swab is an emulsion composed of 89% of water, 10% of tetrahydronaphthalene and 1% of phosphoric acid. The emulsion is obtained by shaking the ingredients thoroughly.

(*c*) The developing agent used for soaking the cotton swab is tetrahydronaphthalene. In this case, the plate after being treated with the developer is wiped over with an aqueous medium containing 10% gum arabic and 1% phosphoric acid.

In all cases described above the printing plate shows a positive image when the exposure of the light-sensitive foil was operated under a negative master.

When 0.05% of the azo dye originating from diazotized aniline and 7′-hydroxy-naphtho-1′,2′:4,5-imidazole are added to the diazo solution, development yields orange-colored images which may also be used directly as stencils, if they are not intended for use as printing plates.

The diazo compounds mentioned in this example are produced in the following manner:

To a solution of 5 g. of 7′-hydroxy-2-ethyl-1(or 3)-N-n-propyl-naphtho-1′,2′:4,5-imidazole in 50 cc. of dioxane and 30 cc. of water there are added 26 cc. of a 10% solution of soda; at a temperature of approximately 30° to 35° C. there is then added a hot solution of 6 g. of naphthoquinone 1(1,2)-diazide-(2)-4-sulfochloride in 25 cc. of dioxane and the mixture is briefly heated to 50° C. When the reaction mixture has cooled to room temperature, it is diluted with water until no more of the condensation product continues to separate. The precipitated product is filtered off by suction and washed with water. The condensation product is recrystallized from a mixture of ethyl alcohol with dioxane (2:1) with the addition of animal charcoal; thus yellow crystals are obtained which decompose at a temperature of about 150° C.

The 7′-hydroxy-1(or 3)-N-(n-propyl-2-ethyl-naphtho-1′,2′:4,5-imidazole is obtained by heating to boiling an aqueous solution of 1 mole of 1,2-diamino-naphthalene-7-sulfo acid and 2 moles of n-propaldehyde for about four hours and by melting the precipitated 2-ethyl-N-(n-propyl)-naphtho-1′,2′:4,5-imidazole-7′-sulfo acid, after it has been drawn off by suction and dried, with a four to fivefold quantity of caustic potash at a temperature of about 230 to 250° C. The molten mass is dissolved in water, neutralized by means of hydrochloric acid and the crude 7′-hydroxy-2-ethyl-1(or 3)-N-(n-propyl)-naphtho-1′,2′:4,5-imidazole separates which is purified by recrystallization from alcohol. It melts at a temperature of 250° to 251° C.

*Example 3*

A 1% solution of the ester conforming to the Formula 3 formed of naphthoquinone-(1,2)-diazide-(2)-5-sulfo acid and 6′-hydroxy - 2 - ethyl - N - (n-propyl) - naphtho-1′,2′:4,5-imidazol in glycol-monomethyl ether is applied in the customary manner as a thin layer to a roughened or superficially oxidized aluminum plate. Subsequent to drying the layer is exposed under a negative master for several minutes to an 18-ampere arc lamp, and the image thus produced is developed with a 2–3% solution of phosphoric acid to which some gum arabic may be added. The developed plate is rinsed with water, and the positive image obtained, which contains light-decomposition products of the diazo compound, can be used immediately for printing. The image after having been wiped over with a 1% solution of phosphoric acid is inked with greasy ink by means of a cotton swab. If the image thus inked is rinsed with water, there is obtained a stencil or a plate showing a deeply colored reproduction.

The above mentioned diazo compound is obtained by the same method as the diazo compound conforming to the Formula 1, which has been described and used in Example 1, with the only difference that 6′-hydroxy-2-ethyl-N-(n-propyl)-naphtho-1′,2′:4,5-imidazole is caused to react with naphthoquinone-(1,2)-diazide-(2)-5-sulfochloride. The yellow diazo compound obtained starts to decompose slowly at a temperature of 145° C.

The 6′-hydroxy-2-ethyl-N-(n-propyl)-naphtho-1′,2′:4,5-imidazole is obtained similarly to the 7′-hydroxy-2-ethyl-N-(n-propyl)-naphtho-1′, 2′:4,5-imidazole described in Example 2 by subjecting 1,2-diamino-naphthalene-6-sulfo acid to reaction with 2 moles of n-propaldehyde in an aqueous solution. The 2-ethyl-N-(n-propyl)-naphtho-imidazole-6′-sulfo acid thus obtained is also very hard to dissolve in water and yields when melted with a fourfold or fivefold quantity of caustic potash at a temperature of about 250° C., 6′-hydroxy-2-ethyl-1(or 3)-N-(n-propyl)-naphtho-1′, 2′:4,5-imidazole which melts when recrystallized from alcohol at 222°–223° C.

A similar diazo compound which corresponds with Formula 4 and decomposes at approximately 140° C. after recrystallization from a mixture of benzene and ligroin, is obtained by the reaction of naphthoquinone-(1,2)-diazide-(2)-5-sulfochloride with 5′-hydroxy-2-ethyl-N-(n-propyl)-naphtho-1′,2′:4,5-imidazole which is produced by the condensation of 1 mole of 1,2-diamino-naphthalene-5-sulfo acid with 2 moles of n-propaldehyde and by the subsequent melting of the resulting naphtho-imidazole-5′-sulfo acid with alkali. The 5′-hydroxy-2-ethyl-N-(n-propyl)-naphtho-1′,2′:4,5-imidazole melts after previous sintering at 210° C.

*Example 4*

To a solution of 2.5 g. of 7′-hydroxy-2-ethyl-(1 or 3-N-n-propyl)-naphtho-1′,2′:4,5-imidazole dissolved in a mixture of 25 cc. of dioxane and 5 cc. of water a solution of 3.3 g. of 8-chloro-naphthoquinone-(1,2)-diazide-(2)-5-sulfochloride in 15 cc. of dioxane is added. While heating the mixture to 45–50° C., 15 cc. of a 10% soda solution are slowly added. Half an hour later the temperature is raised to 60° C. After 15 minutes, the reaction mixture is cooled down and poured into 150 cc. of water. The precipitating yellow condensation product (Formula 5) is drawn off, washed and dried at 40° C. It is recrystallized from alcohol to which a little water has been added, and decomposes at 138° C.

A 1.5% solution of this compound in glycol monomethyl ether is coated on a roughened aluminum foil by means of a plate whirler and the layer is well dried. The sensitized foil is exposed behind a transparent positive pattern and the exposed foil developed to a negative image by wiping over with 5% phosphoric acid.

*Example 5*

A 2% solution of the compound corresponding to Formula 6 in ethylene glycol monomethyl ether is coated by means of a whirler onto a roughened aluminum foil or a grained zinc plate, and the coated solution is subsequently dried. After drying, the light-sensitive layer is exposed under a positive transparent pattern and the exposed layer is then developed to a negative image with an aqueous solution containing 1% or 2% of phosphoric acid. The foil is then inked with greasy ink and used as a printing plate.

If, after exposure under a positive pattern, the layer is wiped over with a 1% or 3% trisodium phosphate solution, and the foil is rinsed with water after said development and then treated on its imaged surface with an aqueous solution containing 0.6% of phosphoric acid and 16% of gum arabic, a positive image of the pattern is obtained.

The compound corresponding to Formula 6 is prepared as follows:

To a solution of 4.5 g. of 7′-hydroxy-N-ethyl-2-methyl-naphtho-1′,2′:4,5-imidazole in a mixture consisting of 20 cc. of dioxane, there are first added 25 cc. of a 10% sodium carbonate solution, 10 cc. of a 10% caustic soda solution and 10 cc. of water and subsequently at 30–40° C. a solution is added containing 5.4 g. of naphthoquinone-(1,2)-diazide-(2)-5-sulfochloride in 25 cc. of dioxane.

The reaction mixture is kept standing for some time and then poured into a mixture of 1 l. of water, some ice and 50 cc. of crude hydrochloric acid. The precipitating reaction product is drawn off. It is washed first with dilute hydrochloric acid (1:10), then with water and dried. After drying it is recrystallized from a mixture of alcohol and dioxane (2:1). The compound corresponding to Formula 6 decomposes at 142° C.

7′-hydroxy-N-ethyl-2-methyl-naphtho-1′,2′:4,5-imidazole is prepared as follows:

12 g. of 1,2-diamino-naphthalene-7-sulfonic acid are suspended in 60 cc. of water and, after adding some ice, mixed with 5 g. of freshly-distilled acetaldehyde. After adding 40 cc. of water, the reaction mixture is heated for one and a half hour on a steam bath and then allowed to cool down. A reaction product separates which is drawn off, washed with water and dried. Yield: about 11 g.

At a temperature of 230-240° C. 11 g. of N-ethyl-2-methyl-naphtho-1′,2′:4,5-imidazole-7′-sulfonic acid are melted in a nickel crucible with 57 g. of potassium hydroxide. After cooling, the melted mass is dissolved in water and neutralized with hydrochloric acid. The precipitating 7′-hydroxy-N-ethyl-2-methyl-naphtho-1′,2′:4,5-imidazole is drawn off and dried. It melts at about 284–288° C. with decomposition.

*Example 6*

A 1.5% solution of the compound corresponding to Formula 7 in ethylene glycol monomethyl ether is coated by means of a whirler onto a roughened or grained aluminum foil, and the coated solution is then dried. After drying, the light-sensitive layer is exposed under a positive transparent pattern and the exposed layer is then developed to a negative image by means of 1–5% phosphoric acid. The foil is then inked with greasy ink and used as a printing plate.

If, after exposure under a positive pattern, the layer is wiped over with 1% or 3% trisodium phosphate solution and the foil is rinsed with water after said development and then treated on its imaged surface with an aqueous solution containing 0.6% of phosphoric acid and 16% of gum arabic, a positive image of the pattern is obtained.

The compound corresponding to Formula 7 is prepared as follows:

2.3 g. of 7′-hydroxy-N-ethyl-2-methyl-naphtho-1′,2′:4,5-imidazole are dissolved in a mixture of 80 cc. of dioxane and 10 cc. of water. To this solution there is added another solution of 3 g. of naphthoquinone-(1,2)-diazide-(2)-4-sulfochloride in 12 cc. of dioxane. While heating this mixture is mixed with 15 cc. of a 10% sodium carbonate solution and then heated for 30 minutes to 60–70° C. The reaction mixture is then cooled down, and the reaction product is precipitated by adding water. After drawing off the fluid the reaction product is washed with water, dried, and recrystallized from a mixture of benzene with petroleum ether. The compound melts at 140–150° C. with decomposition.

The preparation of 7′-hydroxy-N-ethyl-2-methyl-naphtho-1′,2′:4,5-imidazole was described in the preceding example.

*Example 7*

A 1.5% solution of the compound corresponding to Formula 8 in ethylene glycol monoethyl ether is coated by means of a whirler onto a roughened or anodically oxidized aluminum foil, and the coated solution is subsequently dried. After drying, the light-sensitive layer is exposed under a transparent positive pattern and the exposed layer then developed with a 4% or 5% phosphoric acid, which contains also 10% of ethylene glycol monomethyl ether. A negative image is obtained. The foil is then inked with greasy ink and used as a printing plate.

If, after exposure under a positive pattern, the fell is wiped over with a 3% trisodium phosphate solution, rinsed with water after said development, and treated on its imaged surface with an aqueous solution containing 0.6% of phosphoric acid and 16% of gum arabic, a positive image of the pattern is obtained.

The compound corresponding to Formula 8 is prepared as follows:

2.2 g. of 7'-hydroxy-N-n-propyl-naphtho-1',2':4,5-imidazole are dissolved in a mixture of 20 cc. of dioxane and 5 cc. of water. To this solution there is added a second solution consisting of 3 g. of naphthoquinone-(1,2)-diazide-(2)-4-sulfochloride in 12 cc. of dioxane and causes the mixture to react by slightly heating and adding 12 cc. of a 10% solution of sodium carbonate. The reaction mixture is heated another 30–45 minutes to 50–60° C., then cooled down and poured into about 250 cc. of water, to which some sodium chloride had been added. A light yellow product precipitates, which is drawn off, washed with water and dried at 40° C. The reaction product is recrystallized from a benzene-petroleum ether mixture. Upon heating the sulfo ester corresponding to Formula 8 the substance decomposes at 215–218° C.

A 7'-hydroxy-N-n-propyl-naphtho-1',2':4,5-imidazole is prepared as follows:

93 g. of 2-naphthol-7-sulfonic acid (60%) are heated in an autoclave with 225 g. of a commercial sodium bisulfite solution and 45 g. of n-propyl-amine to 150° C. over a period of 12 hours. Subsequently the contents of the autoclave are acidified by adding about 300 cc. of a 25% sulfuric acid, and the excess bisulfite is decomposed by boiling. A precipitate, the 2-n-propyl-amino-naphthalene-7-sulfonic acid, is formed. It is drawn off, washed with hot water and dried. Yield: 45 g.

45 g. of the 2-n-propyl-amino-naphthalene-7-sulfonic acid thus obtained are suspended in a mixture consisting of 38 g. of sodium hydroxide, 200 cc. of water and 180 g. of ice, and the mixture is then mixed with a benzene diazonium chloride solution (prepared from 18 g. of aniline). An aqueous solution of the azo dye of the 2-n-propyl-amino-naphthalene-7-sulfonic acid is obtained.

This dyestuff solution is filtered, and then 79 g. of sodium hydrosulfite are added. This mixture is cautiously heated to 50° C. and the only weakly colored solution is then filtered. Upon acidifying the solution with hydrochloric acid about 14 g. of 1-amino-2-n-propylamino-naphthalene-7-sulfonic acid are obtained.

14 g. of this sulfonic acid are boiled for one hour with 120 cc. of formic acid. Minor quantities of impurities are removed by filtration and then the formic acid is evaporated in a vacuum. The remnant is triturated with a little water, whereupon N-n-propyl-1',2':4,5-naphtho-imidazole-7'-sulfonic acid is obtained in the form of a crystalline mass.

At a temperature of about 190° C. 10 g. of the naphtho-imidazole sulfonic acid thus obtained are melted with 60 g. of caustic potash. As soon as a solid product forms on the surface of the melt the melting process is finished. The caustic potash melt is poured onto ice and then neutralized by adding hydrochloric acid, whereupon 7'-hydroxy-N-n-propyl-naphtho-1',2':4,5-imidazole is obtained in the form of a crystalline product. After recrystallization from ethyl alcohol the compound melts at 257–258° C. The yield amounts to 5 g.

*Example 8*

A 1.5% solution of the compound corresponding to Formula 9 in ethylene glycol monomethyl ether is coated by means of a whirler onto an aluminum foil which had been roughened either by sandblast or by brushing, and the coated solution is then dried. After drying, the light-sensitive layer is exposed under a transparent positive pattern and the exposed layer is then developed to a negative image by means of a 4% phosphoric acid to which either 5% of ethylene glycol monomethyl ether or 10% of alcohol had been added. The foil is then inked with greasy ink and used as a printing plate.

If, after exposure under a positive pattern, the foil is wiped over with a 3% trisodium phosphate solution, rinsed with water after said development and treated on its imaged surface with an aqueous solution containing 0.6% of phosphoric acid and 16% of gum arabic, a positive image of the pattern is obtained.

The compound corresponding to Formula 9 is prepared as follows:

To a solution of 2.8 g. of 7'-hydroxy-N-isobutyl-2-isopropyl-naphtho-1',2':4,5-imidazole in a mixture of 25 cc. of dioxane and 10 cc. of water another solution is added consisting of 2.7 g. of naphthoquinone-(1,2)-diazide-(2)-4-sulfochloride in 12 cc. of dioxane, and, by slightly heating and adding a 10% solution of sodium carbonate the mixture is caused to react. After about 30 minutes an additional 0.3 g. of the sulfochloride just mentioned is added to the reaction mixture, which is then heated for half an hour to 60–70° C. The reaction mixture is then allowed to cool down and poured into 250 cc. of water which had been slightly acidified by means of acetic acid. A light-yellow flake-like product is formed, which is drawn off, washed with water and dried. It decomposes at 118–120° C.

The 7'-hydroxy - N-isobutyl - 2 - isopropyl-naphtho-1',2':4,5-imidazole is prepared as follows:

17.4 g. of 1,2-diamino-7-naphthol are suspended in 50 cc. of water and then, while cooling, mixed with 14.5 g. of isobutyric aldehyde. A product is formed which is first an oil, but becomes crystalline after heating for half an hour to 80–90° C. and then cooling again. It is drawn off and washed with water. 13 g. of 7'-hydroxy-N-isobutyl - 2 - isopropyl-naphtho-1',2':4,5-imidazole are obtained; the substance melts at 216–217° C.

*Example 9*

A 1.5% solution of the compound corresponding to Formula 10 in ethylene glycolmonomethyl ether is coated by means of a whirler onto an aluminum foil, which may be either unbrushed or roughened, and the coated solution is subsequently dried. After drying the light sensitive layer is exposed under a transparent positive pattern and the exposed layer is then developed to form a negative image by means of 5% phosphoric acid. The foil is now inked with greasy ink and used as a printing plate.

If, after exposure under a positive pattern, the layer is wiped over with a 5% trisodium phosphate solution and the developed foil is then rinsed with water and treated on its imaged surface with an aqueous solution containing 0.6% of phosphoric acid and 16% of gum arabic, a positive image of the pattern is obtained.

The compound corresponding to Formula 10 is produced in the following way:

2.8 g. of 7'-hydroxy-N-n-butyl-2-n-propyl-naphtho-1',2':4,5-imidazole are dissolved in a mixture of 35 cc. of dioxane and 10 cc. of water. To this solution there are added first a solution of 2.7 g. of naphthoquinone-(1,2)-diazide-(2)-5-sulfochloride in 12 cc. of dioxane and then 13 cc. of a 10% sodium carbonate solution. The mixture is heated on a steam bath to 50° C. and 0.3 g. of the before-mentioned sulfochloride are added after a short time. After one hour and a half 80 cc. of water are added to the reaction mixture, whereupon the reaction product precipitates. It is drawn off, washed with water and dried. It decomposes at 114–115° C.

The 7'-hydroxy - N - n - butyl-2-n-propyl-naphtho-1',2':4,5-imidazole is prepared as follows:

24 g. of 1,2-diamino-naphthalene-7-sulfonic acid are suspended in 120 cc. of water and the suspension is then mixed with 14.5 g. of n-butyric aldehyde. After heating for about one hour on a steam bath the solution is rendered acid by adding dilute hydrochloric acid. The reaction mixture is then allowed to cool down and the precipitating reaction product is separated and dried. About 30 g. of N-n-butyl-2-n-propy-naphtho-1',2':4,5-imidazole-7'-sulfonic acid are obtained.

30 g. of the sulfonic acid thus obtained are melted at about 250° C. with 120 g. of potassium hydroxide in a nickel crucible. After the melt has cooled down it is poured into water. A solution is formed which is neutralized by adding hydrochloric acid, and the separating raw product is filtered off. It is washed with water and then suspended in about 1 l. of hot water. Hydrochloric acid is added in such a quantity that the solution becomes congo acid. The greater part of the suspended product goes into solution. After the addition of some animal charcoal and filtration, the 7'-hydroxy-N-n-butyl-2-n-propyl-naphtho-1',2':4,5-imidazole is precipitated from the purified hydrochloric filtrate by adding sodium bicarbonate. The precipitate is drawn off, washed and dried. 18 g. of the reaction product are obtained which has the melting point of 224–225° C.

*Example 10*

A 1.5% solution of the compound corresponding to Formula 11 in ethylene glycol monomethyl ether is coated by means of a whirler onto a roughened aluminum foil and the coated solution is subsequently dried. After drying the light sensitive layer is exposed under a transparent positive pattern and the exposed layer is then developed to form a negative image, either with a 4% phosphoric acid, to which 10% of alcohol had been added, or with a 5% phosphoric acid, which contains 10% of ethylene glycol monomethyl ether. The foil is then inked with greasy ink and used as a printing plate.

If, after exposure under a positive pattern, the foil is wiped over with a 3% trisodium phosphate solution, rinsed with water after said development, and treated on its imaged surface with an aqueous solution containing 0.6% of phosphoric acid and 16% of gum arabic, a positive image of the pattern is obtained.

The compound corresponding to Formula 11 is prepared as follows:

To a solution containing 5.6 g. of 7'-hydroxy-N-n-butyl-2-n-propyl-naphtho-1',2':4,5-imidazole dissolved in a mixture of 70 cc. of dioxane and 20 cc. of water there is added a solution of 6 g. of naphthoquinone-(1,2)-diazide-(2)-4-sulfochloride in 25 cc. of dioxane. The mixture is heated to 50–60° C. and then caused to react by adding slowly 26 cc. of a 10% sodium carbonate solution. After 30 minutes another 0.3 g. of the before-mentioned sulfochloride are added to the reaction mixture which is heated for another hour. The reaction mixture is then allowed to cool and is mixed with water, whereupon the reaction product precipitates. It is separated, washed with water and dried. It is recrystallized from alcohol to which some water had been added. The compound decomposes at about 135° C.

This application is a continuation-in-part of application Serial No. 472,224, filed November 30, 1954 which, in turn, is a continuation-in-part of application Serial No. 277,714, filed March 20, 1952 and now abandoned.

What is claimed is:

1. A compound having the formula

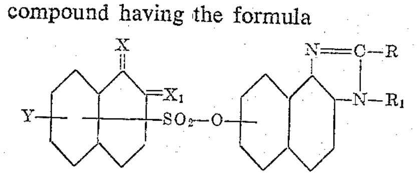

in which X and $X_1$ are selected from the group consisting of $N_2$ and O and are different, Y is selected from the group consisting of hydrogen and halogen, R is selected from the group consisting of hydrogen and alkyl radicals, and $R_1$ is an alkyl radical.

2. A compound having the formula

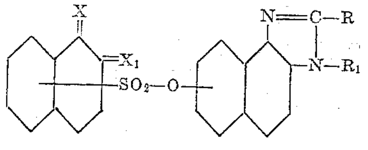

in which X and $X_1$ are selected from the group consisting of $N_2$ and O and are different, and R and $R_1$ are alkyl radicals.

3. A compound having the formula

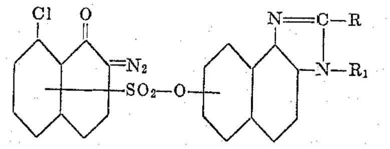

in which R and $R_1$ are alkyl radicals.

4. A compound having the formula

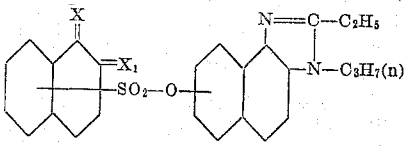

in which X and $X_1$ are selected from the group consisting of $N_2$ and O and are different.

5. A compound having the formula.

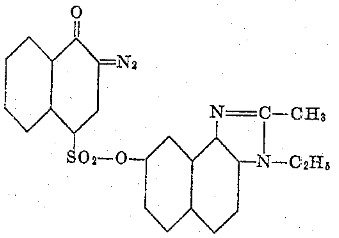

6. A compound having the formula

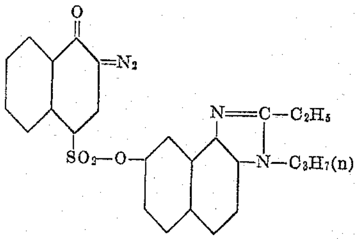

7. A compound having the formula

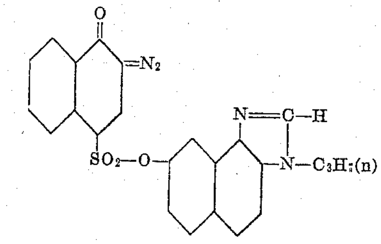

8. A compound having the formula

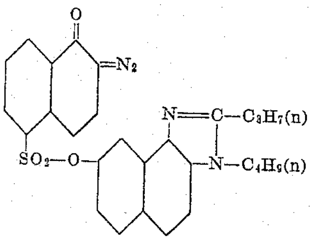

9. A compound having the formula

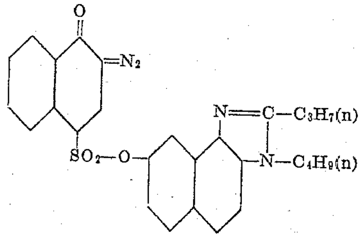

10. A presensitized printing plate comprising a base material having a coating thereon comprising a compound having the formula

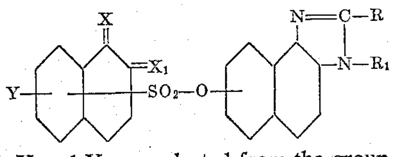

in which X and $X_1$ are selected from the group consisting of $N_2$ and O and are different, Y is selected from the group consisting of hydrogen and halogen, R is selected from the group consisting of hydrogen and alkyl radicals, and $R_1$ is an alkyl radical 11. A presensitized printing plate comprising a base material having a coating thereon comprising a compound having the formula

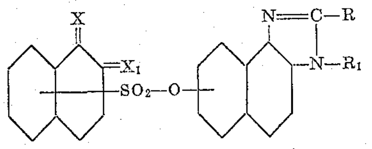

in which X and $X_1$ are selected from the group consisting of $N_2$ and O and are different, and R and $R_1$ are alkyl radicals.

12. A presensitized printing plate comprising a base material having a coating thereon comprising a compound having the formula

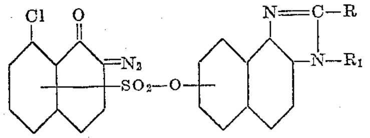

in which R and $R_1$ are alkyl radicals.

13. A presensitized printing plate comprising a base material having a coating thereon comprising a compound having the formula

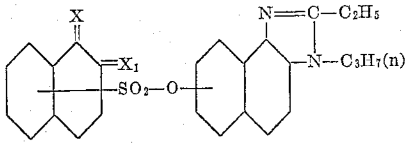

in which X and $X_1$ are selected from the group consisting of $N_2$ and O and are different.

14. A presensitized printing plate comprising a base material having a coating thereon comprising a compound having the formula

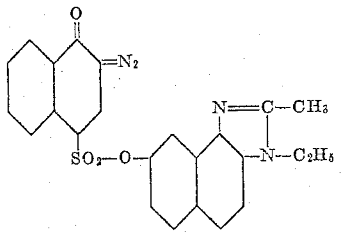

15. A presensitized printing plate comprising a base material having a coating thereon comprising a compound having the formula

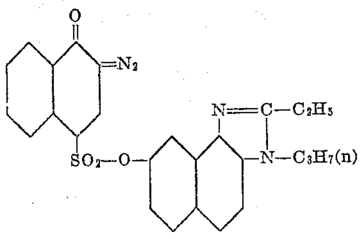

16. A presensitized printing plate comprising a base material having a coating thereon comprising a compound having the formula

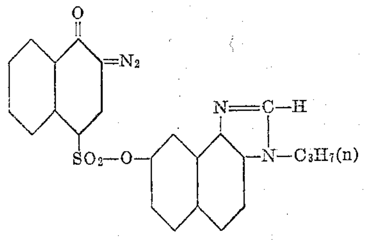

17. A presensitized printing plate comprising a base material having a coating thereon comprising a compound having the formula

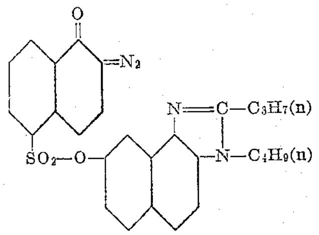

18. A presensitized printing plate comprising a base material having a coating thereon comprising a compound having the formula

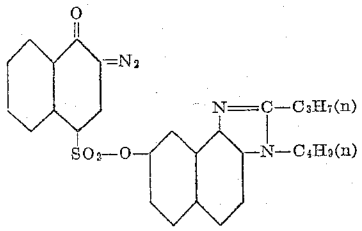

19. A process for developing a printing plate which comprises exposing to light under a master a plate having a compound thereon of the formula

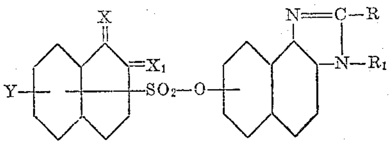

in which X and $X_1$ are selected from the group consisting of $N_2$ and O and are different, Y is selected from the group consisting of hydrogen and halogen, and R and $R_1$ are alkyl radicals; to thereby form a decomposition product in the light struck areas and removing the undecomposed compound by treatment with a developer selected from the group consisting of acids, acid salts, and mixtures thereof.

20. A process according to claim 19 in which the developer is dilute phosphoric acid.

21. A process for developing a printing plate which comprises exposing to light under a master a plate having a compound thereon of the formula

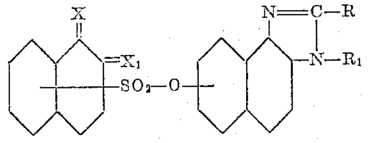

in which X and $X_1$ are selected from the group consisting of $N_2$ and O and are different, R is selected from the group consisting of hydrogen and alkyl radicals, and $R_1$ is an alkyl radical; to thereby form a decomposition product in the light struck areas and removing the undecomposed compound by treatment with a developer selected from the group consisting of acids, acid salts, and mixtures thereof.

22. A process according to claim 21 in which the developer is dilute phosphoric acid.

23. A process for developing a printing plate which comprises exposing to light under a master a plate having a compound thereon of the formula

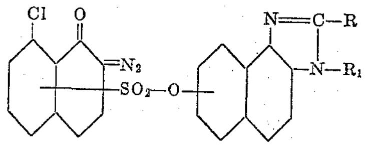

in which R and $R_1$ are alkyl radicals; to thereby form a decomposition product in the light struck areas and removing the undecomposed compound by treatment with a developer selected from the group consisting of acids, acid salts, and mixtures thereof.

24. A process according to claim 23 in which the developer is dilute phosphoric acid.

25. A process for developing a printing plate which comprises exposing to light under a master a plate having a compound thereon of the formula

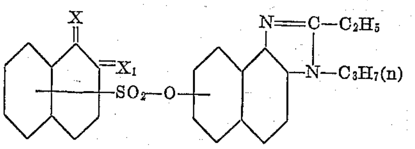

in which X and $X_1$ are selected from the group consisting of $N_2$ and O and are different; to thereby form a decomposition product in the light struck areas and removing the undecomposed compound by treatment with a developer selected from the group consisting of acids, acid salts, and mixtures thereof.

26. A process according to claim 25 in which the developer is dilute phosphoric acid.

27. A process for developing a printing plate which comprises exposing to light under a master a plate having a compound thereon of the formula

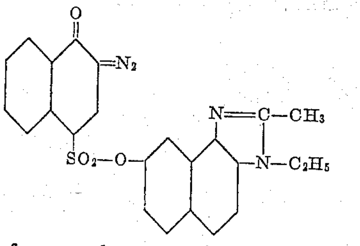

to thereby form a decomposition product in the light struck areas and removing the undecomposed compound by treatment with a developer selected from the group consisting of acids, acid salts, and mixtures thereof.

28. A process according to claim 27 in which the developer is dilute phosphoric acid.

29. A process for developing a printing plate which comprises exposing to light under a master a plate having a compound thereon of the formula

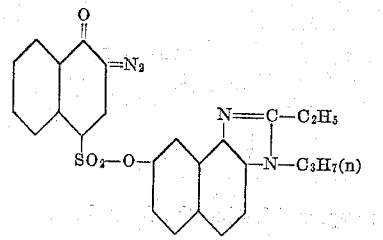

to thereby form a decomposition product in the light struck areas and removing the undecomposed compound by treatment with a developer selected from the group consisting of acids, acid salts, and mixtures thereof.

30. A process according to claim 29 in which the developer is dilute phosphoric acid.

31. A process for developing a printing plate which comprises exposing to light under a master a plate having a compound thereon of the formula

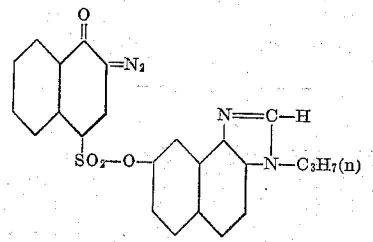

to thereby form a decomposition product in the light struck areas and removing the undecomposed compound by treatment with a developer selected from the group consisting of acids, acid salts, and mixtures thereof.

32. A process according to claim 31 in which the developer is dilute phosphoric acid.

33. A process for developing a printing plate which comprises exposing to light under a master a plate having a compound thereon of the formula

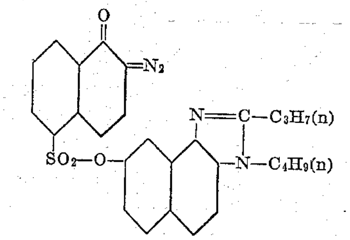

to thereby form a decomposition product in the light struck areas and removing the undecomposed compound by treatment with a developer selected from the group consisting of acids, acid salts, and mixtures thereof.

34. A process according to claim 33 in which the developer is dilute phosphoric acid.

35. A process for developing a printing plate which comprises exposing to light under a master a plate having a compound thereon of the formula

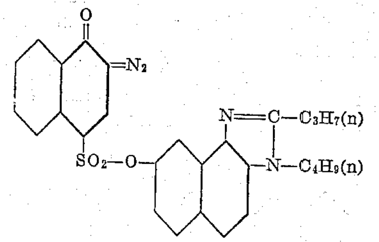

to thereby form a decomposition product in the light struck areas and removing the undecomposed compound by treatment with a developer selected from the group consisting of acids, acid salts, and mixtures thereof.

36. A process according to claim 35 in which the developer is dilute phosphoric acid.

37. A process for developing a printing plate which comprises exposing to light under a master a plate having a compound thereon of the formula

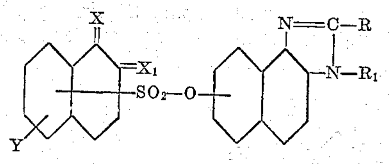

in which X and $X_1$ are selected from the group consisting of $N_2$ and O and are different, Y is selected from the group consisting of hydrogen and halogen, and R and $R_1$ are alkyl radicals; to thereby form a decomposition product in the light struck areas and removing the decomposition product by treatment with a weakly alkaline solution.

38. A process for developing a printing plate which comprises exposing to light under a master a plate having a compound thereon of the formula

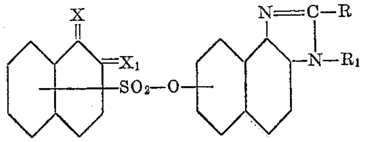

in which X and $X_1$ are selected from the group consisting of $N_2$ and O and are different, R is selected from the group consisting of hydrogen and alkyl radicals, and $R_1$ is an alkyl radical; to thereby form a decomposition product in the light struck areas and removing the decomposition product by treatment with a weakly alkaline solution.

39. A process for developing a printing plate which comprises exposing to light under a master a plate having a compound thereon of the formula

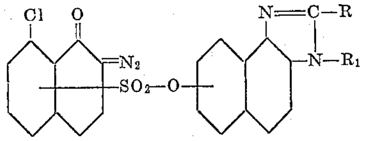

in which R and $R_1$ are alkyl radicals; to thereby form a decomposition product in the light struck areas and removing the decomposition product by treatment with a weakly alkaline solution.

40. A process for developing a printing plate which comprises exposing to light under a master a plate having a compound thereon of the formula

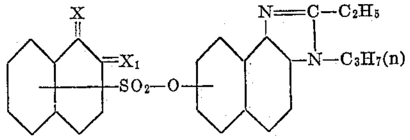

in which X and $X_1$ are selected from the group consisting of $N_2$ and O and are different; to thereby form a decomposition product in the light struck areas and removing the decomposition product by treatment with a weakly alkaline solution.

41. A process for developing a printing plate which comprisis exposing to light under a master a plate having a compound thereon of the formula

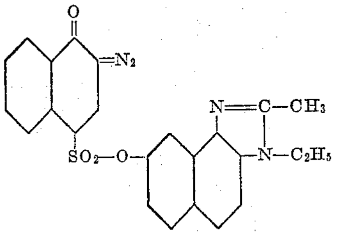

to thereby form a decomposition product in the light struck areas and removing the decomposition product by treatment with a weakly alkaline solution.

42. A process for developing a printing plate which comprises exposing to light under a master a plate having a compound thereon of the formula

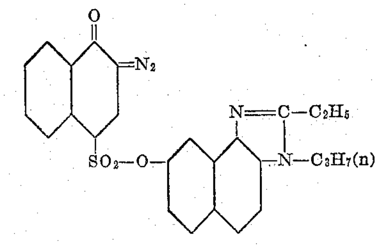

to thereby form a decomposition product in the light struck areas and removing the decomposition product by treatment with a weakly alkaline solution.

43. A process for developing a printing plate which comprises exposing to light under a master a plate having a compound thereon of the formula

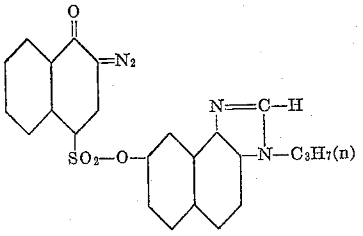

to thereby form a decomposition product in the light struck areas and removing the decomposition product by treatment with a weakly alkaline solution.

44. A process for developing a printing plate which comprises exposing to light under a master a plate having a compound thereon of the formula

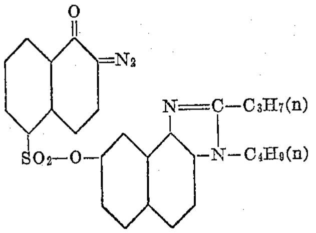

to thereby form a decomposition product in the light struck areas and removing the decomposition product by treatment with a weakly alkaline solution.

45. A process for developing a printing plate which comprises exposing to light under a master a plate having a compound thereon of the formula

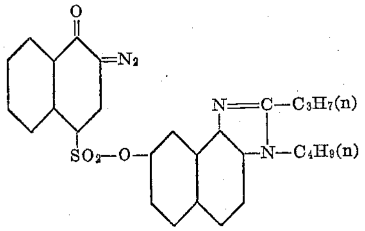

to thereby form a decomposition product in the light struck areas and removing the decomposition product by treatment with a weakly alkaline solution.

46. A compound having the formula

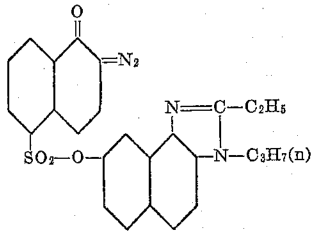

47. A compound having the formula

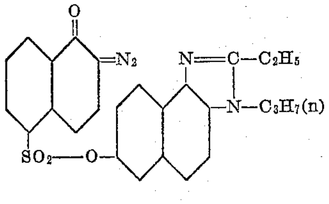

48. A compound having the formula
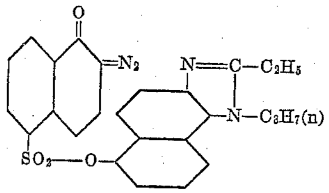
49. A compound having the formula
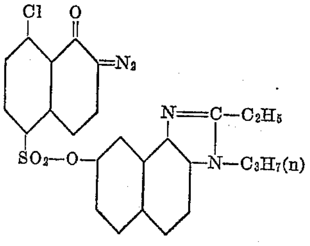
50. A compound having the formula
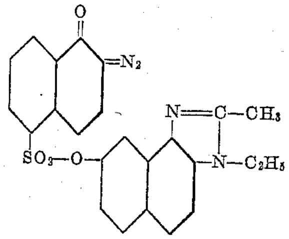
51. A compound having the formula
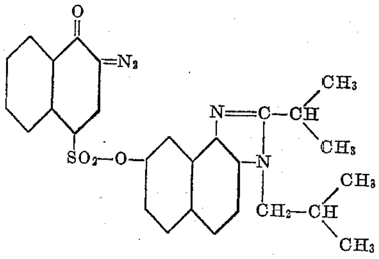
References Cited in the file of this patent
FOREIGN PATENTS
| | | |
|---|---|---|
| 497,135 | Belgium | Nov. 16, 1950 |
| 510,152 | Belgium | Sept. 25, 1953 |